(12) United States Patent
Murakami et al.

(10) Patent No.: US 8,304,940 B2
(45) Date of Patent: Nov. 6, 2012

(54) STATOR

(75) Inventors: Satoshi Murakami, Hazu (JP); Takamasa Takeuchi, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 432 days.

(21) Appl. No.: 12/591,926

(22) Filed: Dec. 4, 2009

(65) Prior Publication Data
US 2010/0176668 A1    Jul. 15, 2010

(30) Foreign Application Priority Data
Jan. 15, 2009 (JP) .................. 2009-006918

(51) Int. Cl.
*H02K 9/00* (2006.01)
(52) U.S. Cl. .............. 310/54; 310/57; 310/58; 310/260
(58) Field of Classification Search .................. 310/260, 310/52, 54, 57–59, 60 A, 64
See application file for complete search history.

(56) References Cited

U.S. PATENT DOCUMENTS

| | | | |
|---|---|---|---|
| 4,227,108 A * | 10/1980 | Washizu et al. ............... | 310/214 |
| 4,413,201 A * | 11/1983 | Nikitin et al. ................ | 310/260 |
| 4,442,371 A * | 4/1984 | Utsunomiya et al. ......... | 310/260 |
| 4,598,223 A * | 7/1986 | Glennon et al. ............... | 310/260 |
| 5,363,002 A * | 11/1994 | Hernden et al. ................ | 310/54 |
| 5,718,302 A | 2/1998 | Hasebe et al. | |
| 6,759,770 B1 | 7/2004 | Wang et al. | |
| 7,952,240 B2 * | 5/2011 | Takenaka et al. ............... | 310/54 |
| 2008/0303361 A1 | 12/2008 | Ito et al. | |

FOREIGN PATENT DOCUMENTS

| | | |
|---|---|---|
| JP | A-08-130856 | 5/1996 |
| JP | A 2004-320996 | 11/2004 |
| JP | A 2005-323416 | 11/2005 |
| JP | A 2006-87172 | 3/2006 |
| JP | A 2008-306869 | 12/2008 |

OTHER PUBLICATIONS

International Search Report mailed Feb. 2, 2010 for PCT/JP2009/070475.

* cited by examiner

*Primary Examiner* — Dang Le
(74) *Attorney, Agent, or Firm* — Oliff & Berridge, PLC

(57) ABSTRACT

A stator that includes a cylindrical stator core, which has a plurality of slots that are provided at predetermined intervals in a circumferential direction and open toward an inner peripheral surface of the stator core; and a coil, which has a coil end portion protruding from an axial end of the stator core.

26 Claims, 10 Drawing Sheets

STATOR

INCORPORATION BY REFERENCE

The disclosure of Japanese Patent Application No. 2009-006918 filed on Jan. 15, 2009 including the specification, drawings and abstract is incorporated herein by reference in its entirety.

BACKGROUND

The present invention relates to a stator including a cylindrical stator core having a plurality of slots that are provided at predetermined intervals in a circumferential direction, and are open toward an inner peripheral surface of the stator core, and a coil that has a coil end portion protruding from an axial end of the stator core.

As a method for cooling a coil end portion that protrudes from an axial end of a stator core, a technique is known in which a coil end portion is cooled by blowing a cooling medium from above to an outer peripheral surface of the coil end portion (see, e.g., Japanese Patent Application Publication No. JP-A-H08-130856). In the structure described in Japanese Patent Application Publication No. JP-A-H08-130856, oil as a cooling medium, which is discharged from an oil pump, is supplied to a chamber provided above the coil end portion, and the oil is blown from a nozzle that is formed in the bottom of the chamber toward the coil end portion. Then, the coolant blown to the coil end portion cools the coil end portion by heat exchange with the coil end portion in a path through which the coolant flows until the coolant falls from the coil end portion.

SUMMARY

However, in the structure shown in Japanese Patent Application Publication No. JP-A-H08-130856, since the path through which the cooling medium blown to the coil end portion flows until the cooling medium falls from the coil end portion is not controlled at all, the cooling medium blown to the coil end portion flows along an arbitrary path according to the gravity or the like. Thus, it is difficult to uniformly cool the entire coil end portion, whereby the temperature may become uneven, for example, the temperature becomes locally high in a lower part or the like of the coil end portion.

In addition to the fact that the cooling medium can flow in an arbitrary path, the flow rate of the cooling medium during heat exchange with the coil end portion depends only on the gravity. Thus, even if the amount of cooling medium blown from the nozzle is increased, the flow rate of the cooling medium does not necessarily increase according to the increase in the amount of cooling medium, and thus, the cooling efficiency does not necessarily increase accordingly.

The present invention has been developed in view of the above problems, and it is an object of the present invention to provide a stator capable of substantially uniformly cooling an entire coil end portion, and capable of increasing the flow rate of a cooling medium flowing in a cooling path when increasing the amount of cooling medium, thereby improving cooling efficiency.

In order to achieve the above object, a stator includes a cylindrical stator core, which has a plurality of slots that are provided at predetermined intervals in a circumferential direction and open toward an inner peripheral surface of the stator core, and a coil, which has a coil end portion protruding from an axial end of the stator core. In the stator, the coil end portion includes a plurality of axial conductor portions, which are provided continuously with slot conductor portions that are respectively inserted in the plurality of slots, and extend from the plurality of slots outwards in an axial direction of the stator; the stator includes a cover member provided with a main body portion that covers at least an outer peripheral surface of the coil end portion along an entire circumference, accommodating chambers that are formed radially inside the main body portion and individually accommodate the plurality of axial conductor portions, and an introducing path through which a cooling medium is introduced into the accommodating chambers; and a gap between an inner wall surface of each of the accommodating chambers and each of the axial conductor portions serves as a cooling path in which the cooling medium introduced from the introducing path flows.

According to the above characteristic structure, in each of the plurality of axial conductor portions, the cooling path through which the cooling medium flows is formed in the gap between the axial conductor portion and the inner wall surface of the corresponding accommodating chamber in the cover member. Thus, the axial conductor portions can be substantially uniformly cooled in all the slots. Therefore, the entire coil end portion can be substantially uniformly cooled, whereby non-uniformity of the temperature in the coil end portion can be suppressed.

Moreover, the axial conductor portions are respectively accommodated in the accommodating chambers, and the cooling path, through which the cooling medium introduced from the introducing path flows, is defined by the inner wall surfaces of the accommodating chambers. Thus, the cooling medium supplied to the accommodating chambers can be suppressing from flowing in a path other than the cooling path. Therefore, when the amount of the cooling medium supplied to the introducing path is increased, the flow rate of the cooling medium flowing in the cooling path increases according to the increase in the amount of cooling medium, whereby the cooling efficiency can be improved.

The cooling path may have an opening that is open inwards in a radial direction of the stator.

According to this structure, the cooling medium can be discharged inwards in the radial direction of the stator, after cooling the axial conductor portions. Thus, a discharge path of the cooling medium from the accommodating chambers can be appropriately ensured. Moreover, in the case where conductor portions provided continuously with the axial conductor portions are disposed radially inside, the refrigerator can be supplied to the conductor portions after cooling the axial conductor portions. Thus, the refrigerator, which has been used to cool the axial conductor portions, can be used to cool the conductor portions without wasting the refrigerator.

Moreover, the cooling path may have an outer peripheral region where the cooling medium flows along an outer surface of each of the axial conductor portions, and lateral region where the cooling medium flows along both side surfaces of the each axial conductor portion in the circumferential direction of the stator.

According to this structure, since the cooling medium can be supplied to both the outer surface, in the radial direction of the stator, and the side surfaces, in the circumferential direction of the stator, of each of the axial conductor portions, the cooling medium can be made to flow while contacting the axial conductor portions in a large contact area. Thus, the axial conductor portions can be cooled more efficiently.

Moreover, the cooling path may have a throttle portion where a flow path cross-sectional area gradually decreases from a junction with the introducing path toward a downstream side.

According to this structure, the flow rate of the cooling medium on the downstream side of the throttle portion in the cooling path can be made higher than that of the cooling medium in the introducing path, whereby the cooling efficiency can further be improved.

Moreover, the introducing path may be formed by recessed grooves formed in an end face of the main body portion located on the stator core side.

According to this structure, the introducing path and the main body portion can be the same part, whereby an increase in the number of parts can be suppressed. Moreover, the process of forming the introducing path in the manufacturing of the cover member can be simplified.

Moreover, the introducing path may have a circulating path, which extends in the entire circumference on a radially outer side of the accommodating chambers, and a connection path that connects the circulating path and inside of each of the accommodating chambers.

According to this structure, the cooling medium can be supplied to each of the accommodating chambers only by supplying the cooling medium to the circulating path.

Moreover, the connection path may have a first connection path connecting the circulating path and each of the accommodating chambers through a radial outer wall of the each accommodating chamber, and a second connection path that is provided between two adjacent ones of the accommodating chambers, extends radially inwards from the circulating path, and connects to the accommodating chambers through circumferential sidewalls of the accommodating chambers.

According to this structure, the cooling medium can be supplied to the accommodating chambers from both the radially outer wall side and the circumferential sidewall side. Thus, the cooling medium can be relatively uniformly supplied to each part of the cooling path formed in the accommodating chambers, whereby the cooling efficiency can further be improved.

Moreover, the cover member may have a plurality of radial wall portions, which are radially disposed along the radial direction of the stator and each inserted between two adjacent ones of the axial conductor portions, and each of the accommodating chambers may be formed between two adjacent ones of the radial wall portions.

According to this structure, since both inner wall surfaces of each of the accommodating chambers in the circumferential direction of the stator can be formed by the side surfaces of the radial wall portions in the circumferential direction of the stator, whereby the plurality of accommodating chambers can be appropriately defined in the circumferential direction.

Moreover, a ridge that protrudes in the circumferential direction of the stator and extends in the axial direction of the stator may be formed on an inner end of each of the radial wall portions in the radial direction of the stator.

According to this structure, an opening can be formed in an inner end of each of the accommodating chambers in the radial direction of the stator, so that the opening has a smaller width than the width in the circumferential direction of the stator on a radially outer side of this end.

Moreover, the stator may further include a sealing member that is an annular disc-shaped member positioned radially inside the cover member and attached to the axial end of the stator core, and that closes openings of the accommodating chambers which are open inwards in the radial direction of the stator, within a range of an axial thickness of the sealing member.

According to this structure, the cooling medium can be suppressed from flowing inwards in the radial direction of the stator, and entering a gap formed between the stator and a rotor provided radially inside the stator.

Moreover, the sealing member may include a plurality of sealing protrusions provided on an outer peripheral surface thereof at the same intervals as those of the plurality of slots, and the sealing protrusions may respectively close the openings of the accommodating chambers.

According to this structure, since the openings of the accommodating chambers are closed, the cooling medium can further be suppressed from flowing inwards in the radial direction of the stator and entering the gap formed between the stator and the rotor provided radially inside the stator.

Moreover, the stator may further include a base member, which is an annular disc-shaped member having a plurality of recesses formed on an inner peripheral surface side thereof so that the recesses correspond to the plurality of slots of the stator core, and which is attached between an axial end face of the stator core and the cover member.

According to this structure, the axial position of the cooling path can be arbitrarily determined by changing the axial thickness of the base member.

Moreover, an insulating sheet may be inserted in each of the slots so that a part of the insulating sheet protrudes from the axial end of the stator, and an axial thickness of the base member may be larger than a protruding amount of the insulating sheet from the axial end.

According to this structure, the cover member can be suppressed from contacting the insulating sheet. Thus, the cooling path can be designed while hardly taking the influences of the insulating sheet into consideration, whereby the cooling path having an appropriate gap can be easily determined.

Moreover, a communication path that provides communication between a cooling medium supply path formed in an outer peripheral surface of the stator core, and the introducing path provided in the cover member, may be formed in the base member.

According to this structure, in the case where the cooling medium supply path is formed in the outer peripheral surface of the stator core, the cooling medium can be appropriately supplied from the cooling medium supply path to the introducing path of the cover member.

Moreover, the main body portion may be formed so as to cover a part of a region on an outer side in the radial direction of the stator of an end face of the coil end portion in the axial end of the stator, in addition to the outer peripheral surface of the coil end portion.

According to this structure, since a larger part of the axial conductor portions can be accommodated in the accommodating portions, the axial conductor portions can be cooled more reliably.

Moreover, the coil end portion may have the axial conductor portions, and circumferential conductor portions which each connect the different slots in the circumferential direction so as to connect corresponding two of the axial conductor portions to each other, and the cover member may be shaped so as to entirely cover the axial conductor portions when viewed in the axial direction.

According to this structure, the entire axial conductor portions can be cooled effectively. Moreover, in the structure in which the cooling path has an opening that is open inwards in the radial direction of the stator, the cooling medium can be supplied to the circumferential conductor portions after cooling the axial conductor portions. Thus, not only the axial conductor portions but also the circumferential conductor portions can be cooled effectively.

Moreover, the stator may further include a cylindrical member having an inner peripheral surface in contact with an outer peripheral surface of the stator core, the stator core may be a stacked structure of annular disc-shaped steel plates, a welding groove may be formed in the outer peripheral surface of the stator core so as to extend in the axial direction in order to further bond the steel plates in the stacked state together by welding, an axial flow path, which is a flow path of the cooling medium flowing in the axial direction on the outer peripheral surface of the stator core, may be formed by the inner peripheral surface of the cylindrical member and the welding groove, and the axial flow path may serve as a cooling medium supply path through which the cooling medium is supplied to the introducing path.

According to this structure, a cooling medium flow path along the axial direction can be formed in the outer peripheral surface of the stator core without forming excess grooves and the like in the stator core. Moreover, by supplying the cooling medium in this flow path, the cooling medium can be appropriately supplied along the outer peripheral surface of the stator core into the accommodating chambers for cooling the coil end portion.

Moreover, the cylindrical member may have a circumferential recessed groove, which is formed in the inner peripheral surface so as to extend in a circumferential direction of the stator in an entire circumference of the stator, a circumferential flow path, which is a flow path of the cooling medium flowing in the circumferential direction on the outer peripheral surface of the stator core, may be formed by the outer peripheral surface of the stator core and the circumferential recessed groove, and the circumferential flow path may cross the axial flow path, and communicates with the axial flow path at the intersection.

According to this structure, the cooling medium flow path extending in the circumferential direction can be formed along the outer peripheral surface of the stator core only by forming the circumferential recessed groove in the inner peripheral surface of the cylindrical member. Thus, the outer peripheral surface of the stator core can be cooled in a desirable manner by supplying the cooling medium to this flow path. Moreover, since the circumferential flow path and the axial flow path cross each other, and communicate with each other at the intersection, supply and merge of the cooling medium between both flow paths can be implemented, whereby both cooling of the outer peripheral surface of the stator core, and supply of the cooling medium into the accommodating chambers can be appropriately implemented.

DETAILED DESCRIPTION OF EMBODIMENTS

Figure 1:
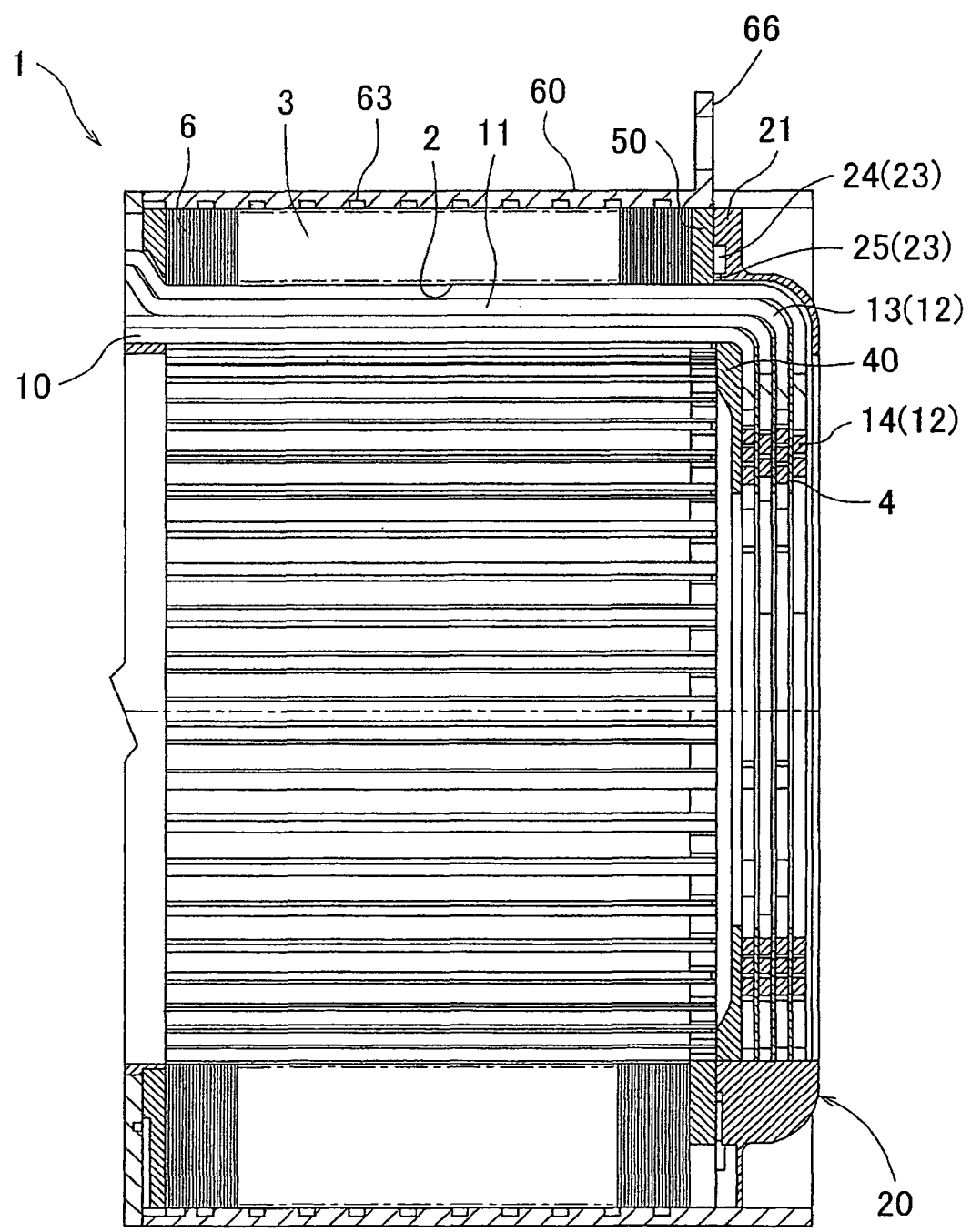
FIG. 1 is an axial cross-sectional view of a stator according an embodiment of the present invention.
Figure 2:
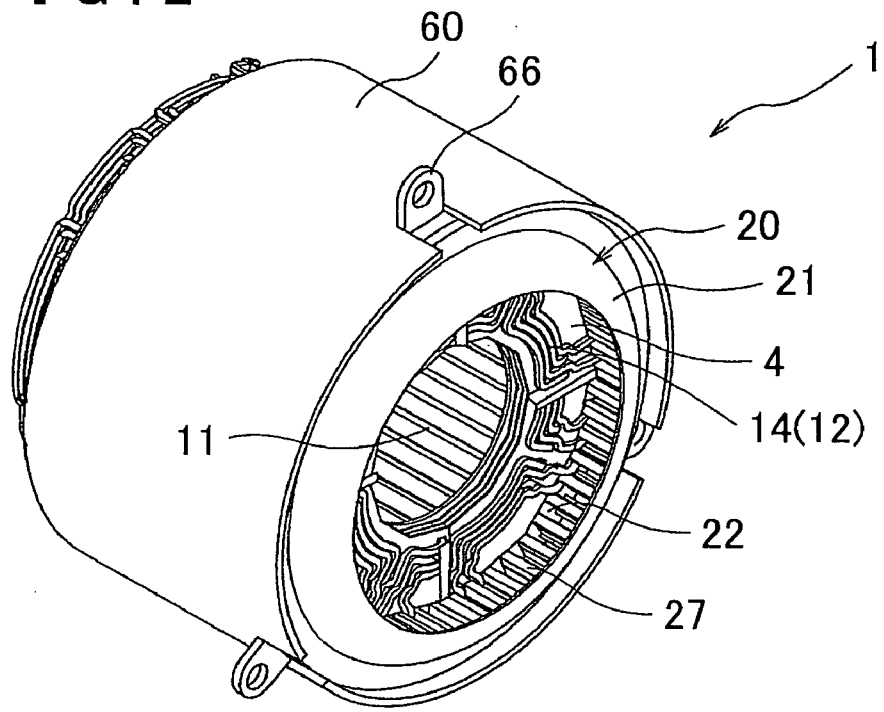
FIG. 2 is a perspective view of the stator in the state where a cover member has been moved in an axial direction.
Figure 3:
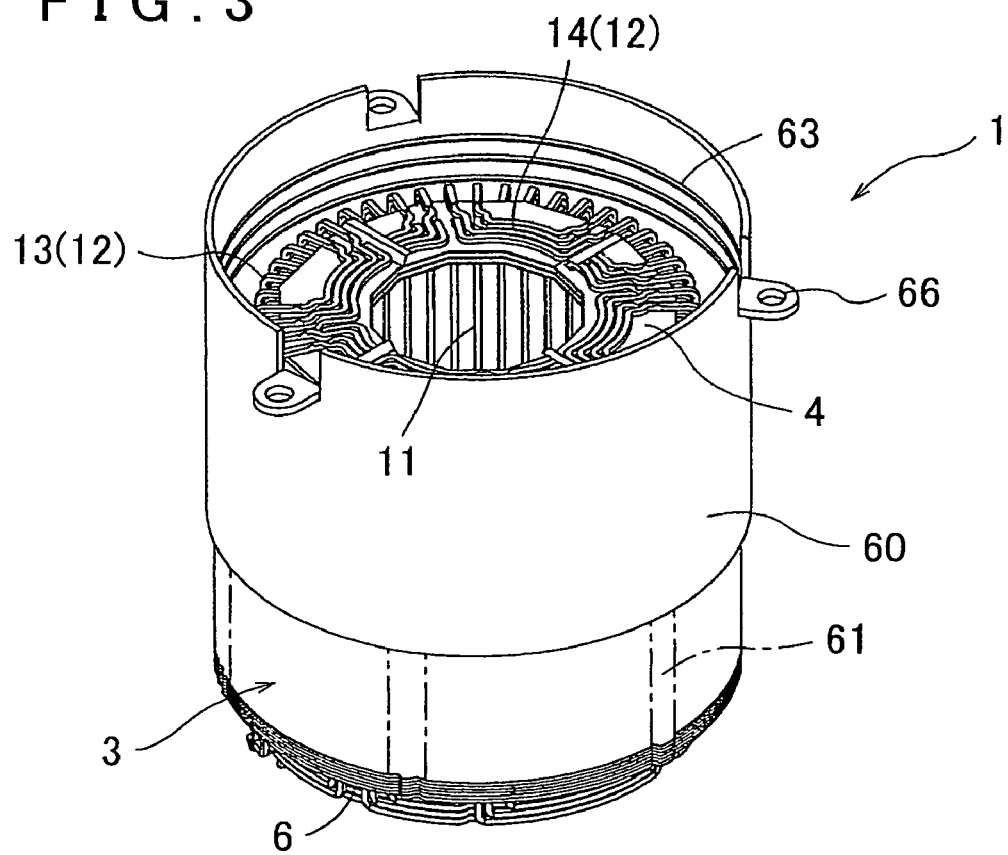
FIG. 3 is a perspective view of the stator in the state where the cover member has been removed, and a cylindrical member has been moved in the axial direction.
Figure 4:
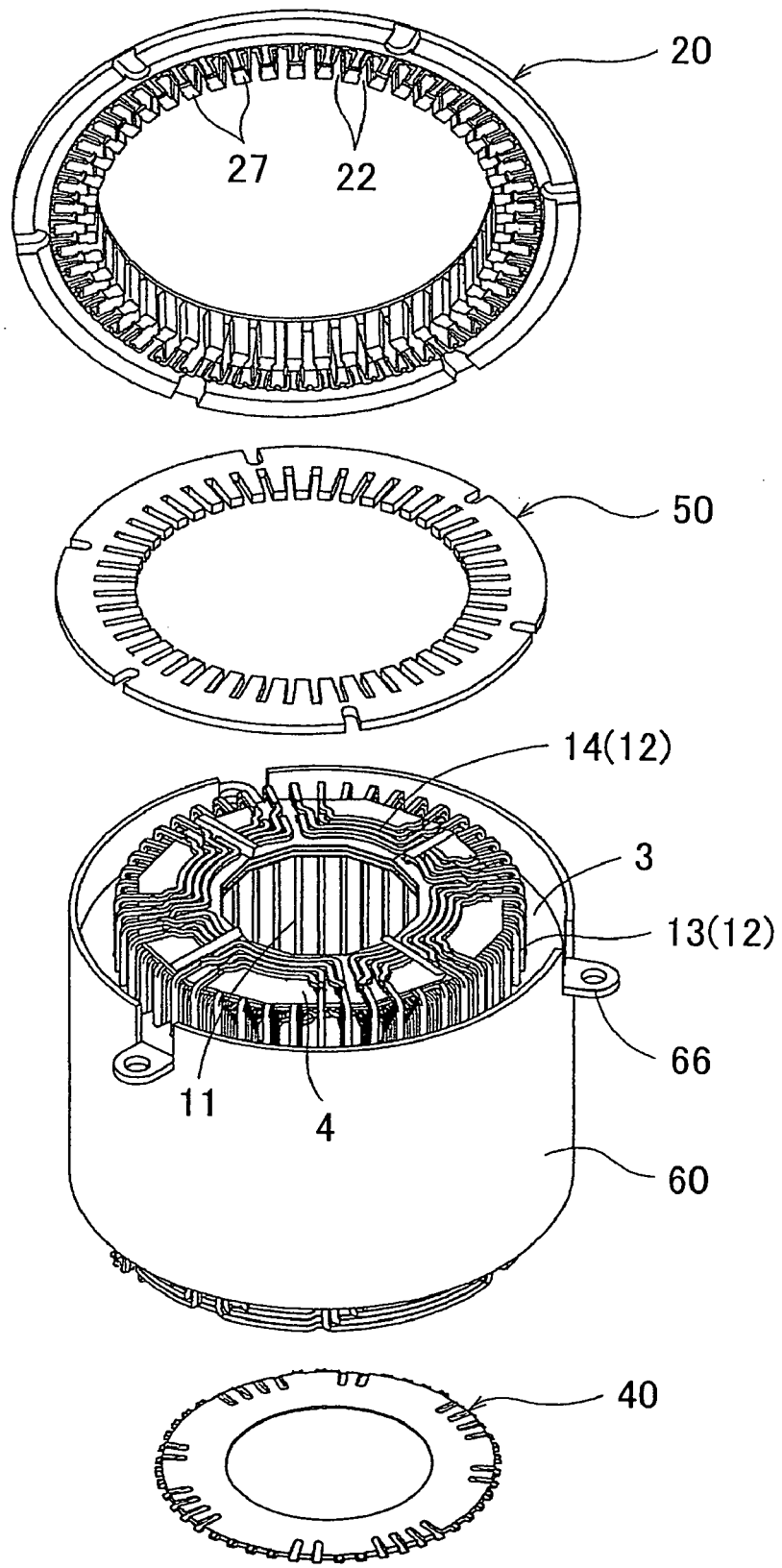
FIG. 4 is an exploded perspective view of the stator.

An embodiment of the present invention will be described below with reference to the accompanying drawings. FIG. 1 is an axial cross-sectional view of a stator 1 according to the present embodiment. FIG. 2 is a perspective view of the stator 1 in the state where a cover member 20 of the stator 1 has been moved in an axial direction. FIG. 3 is a perspective view of the stator 1 in the state where the cover member 20 has been removed, and a cylindrical member 60 has been moved in the axial direction. FIG. 4 is an exploded perspective view of the stator 1. As shown in these drawings, the stator 1 of the present embodiment includes the cover member 20 that covers a coil end portion 12, and the cover member 20 includes accommodating chambers 22 for individually accommodating a plurality of axial conductor portions 13 that form the coil end portion 12. The cover member 20 further includes an introducing path 23 for introducing a coolant into the accommodating chambers 22, so that the coolant introduced from the introducing path 23 flows through a cooling path 30, which is formed by gaps between the inner wall surface of each accommodating chamber 22 and each axial conductor portion 13, thereby individually cooling the plurality of axial conductor portions 13. In the present embodiment, the coolant corresponds to a cooling medium in the present invention. The coolant can be, e.g., oil. The structure of the stator 1 of the present embodiment will be described in detail below sequentially with respect to a general structure of the stator 1, the structure of the cover member 20, the structure of a base member 50, the structure of a sealing member 40, the attachment order, and a cooling mechanism of the stator 1. Note that, in the following description, an axial direction, a circumferential direction, and a radial direction are defined based on the axial center of the stator 1, unless otherwise specified.

1. General Structure of the Stator

As shown in FIGS. 1 through 4, the stator 1 includes, as main components, a stator core 3, the cylindrical member 60, a coil 10, the cover member 20, the base member 50, and the sealing member 40.

As shown in FIG. 1, the stator core 1 is a stacked structure of annular disc-shaped electromagnetic steel plates 6, and is formed in a substantially cylindrical shape. In the present embodiment, the electromagnetic steel plates 6 correspond to steel plates in the present invention. A plurality of slots 2, which extend in an axial direction of the stator core 3, are provided in the inner peripheral surface of the stator core 3 at predetermined intervals along a circumferential direction. The slots 2 have the same cross-sectional shape, and are open on the inner peripheral surface side at a predetermined width and a predetermined depth. In the present embodiment, the stator core 3 has a total of 48 slots 2 along the entire circumference. The coil 10 is wound around the slots 2, thereby forming the coil end portion 12 that protrudes from an axial end of the stator core 3.

As shown in FIG. 3, recesses, which are recessed radially inwards and used for further bonding the electromagnetic steel plates 6 in the stacked state together by welding, are formed at six positions on the outer diameter side of each of the plurality of electromagnetic steel plates 6 of the stator core 3, so as to divide the outer periphery substantially equally into six. In the stacked state of the electromagnetic steel plates 6, the recesses connect to each other in the stacking direction (the same direction as the axial direction). Thus, welding grooves 61, extending in the axial direction, are formed in the entire axial length in the outer peripheral surface of the stator core 3 at positions which divide the outer periphery substantially equally into six in the circumferential direction. Note that, as shown in FIGS. 3 and 15, each welding groove 61 is formed by a pair of grooves that are formed adjacent to each other.

The stator core 3 is fixedly accommodated, by, e.g., shrink fitting or the like, in the cylindrical member 60 whose inner peripheral surface is in contact with the outer peripheral surface of the stator core 3. The cylindrical member 60 has three attaching portions 66 that are equally distributed in the circumferential direction. Thus, the stator 1 is configured to be fixable to a case (not shown) for accommodating the stator 1 by the attaching portions 66 of the cylindrical member 60.

Moreover, as shown in FIG. 3, circumferential recessed grooves 63, extending in the circumferential direction in the entire circumference, are formed in the inner peripheral surface of the cylindrical member 60. Note that the circumferential recessed grooves 63 are formed at a plurality of positions in the axial direction.

As shown in FIGS. 1 and 4, the coil 10 has slot conductor portions 11 that are respectively inserted into the plurality of slots 2 of the stator core 3, and the coil end portion 12. The coil end portion 12 of the coil 10 has: a plurality of axial conductor portions 13, which are provided continuously with the slot conductor portions 11 respectively inserted into the plurality of slots 2, and extend radially outwards from the plurality of slots 2, respectively; and circumferential conductor portions 14, which connect different slots 2 to each other in the circumferential direction to connect two axial conductor portions 13 to each other.

Moreover, the coil 10 is formed in advance in such a predetermined shape that can be wound around the stator core 3, and as show in FIG. 1, a plurality of linear conductors, which form the coil 10, are inserted in each slot 2 of the stator core 3. Note that, in the present embodiment, four linear conductors are inserted in each slot 2. Moreover, the linear conductors of the coil 10 have a rectangular cross section. In each slot conductor portion 11, the four linear conductors are arranged in line in a radial direction inside the slot 2. Moreover, the linear conductors extend in the axial direction continuously with the slot conductor portions 11, and protrude in the axial direction from the stator core 3, thereby forming the axial conductor portions 13 of the coil end portion 12. In each axial conductor portion 13, the four linear conductors are bent radially inwards from a state substantially parallel to the axial direction, while being held aligned in line, and are arranged so as to be substantially parallel to the radial direction. Note that, as can be seen from FIG. 4, the axial conductor portions 13 are positioned so as not to overlap each other in the circumferential direction. In the present embodiment, those portions of the linear conductors of the coil end portion 12, which are located at the same circumferential positions as those of the slot conductor portions 11, are the axial conductor portions 13. Moreover, in each circumferential conductor portion 14, two linear conductors, which are located outside in the radial direction in the slot 2, are arranged adjacent to each other in the radial direction at a position located at a predetermined distance away from the axial end of the stator core 3 in an axially outward direction, and two linear conductors, which are located inside in the radial direction in the slot 2, are arranged adjacent to each other in the radial direction at a position located closer to the stator core 3 than the above position is in the axial direction.

In the present embodiment, the stator 1 is a stator that is used for rotating electrical machines that are driven by a three-phase alternating current, and the coil 10 also has a three-phase structure (U-phase, V-phase, and W-phase). Moreover, four linear conductors of the same phase are inserted in each of two adjacent slots 2. As shown in FIG. 4, a total of four linear conductors, which is a combination of two linear conductors located outside in the radial direction in one of the adjacent slots 2 and two linear conductors located outside in the radial direction in the other slot 2, are arranged adjacent to each other in the radial direction at a position located at a predetermined distance away from the axial end of the stator core 3 in the axially outward direction, and a total of four linear conductors, which is a combination of two linear conductors located inside in the radial direction in the one slot 2 and two linear conductors located inside in the radial direction in the other adjacent slot 2, are arranged adjacent to each other in the radial direction at a position located closer to the stator core 3 than the above position is in the axial direction.

As shown in FIG. 4, the circumferential conductor portions 14 of different phases are positioned so as to partially overlap each other in the circumferential direction. In order to ensure an electrical insulating property between the circumferential conductor portions 14 of different phases, an interphase insulating sheet 4 is interposed between the overlapping portions of the circumferential conductor portions 14 of different phases. For example, a sheet, which is formed by a material having a high electrical insulating property and high heat resistance, such as a bonded sheet of aramid fiber and polyethylene terephthalate, or the like may be used as the interphase insulating sheet 4.

Moreover, as shown in FIG. 4, a void is formed between the two adjacent axial conductor portions 13. These voids are formed at predetermined intervals along the circumferential direction, and the width of the voids in the circumferential direction is substantially uniform in the axial direction. Radial wall portions 27 of the cover member 20, which will be described below, are inserted in these voids.

2. Structure of the Cover Member

Figure 5:
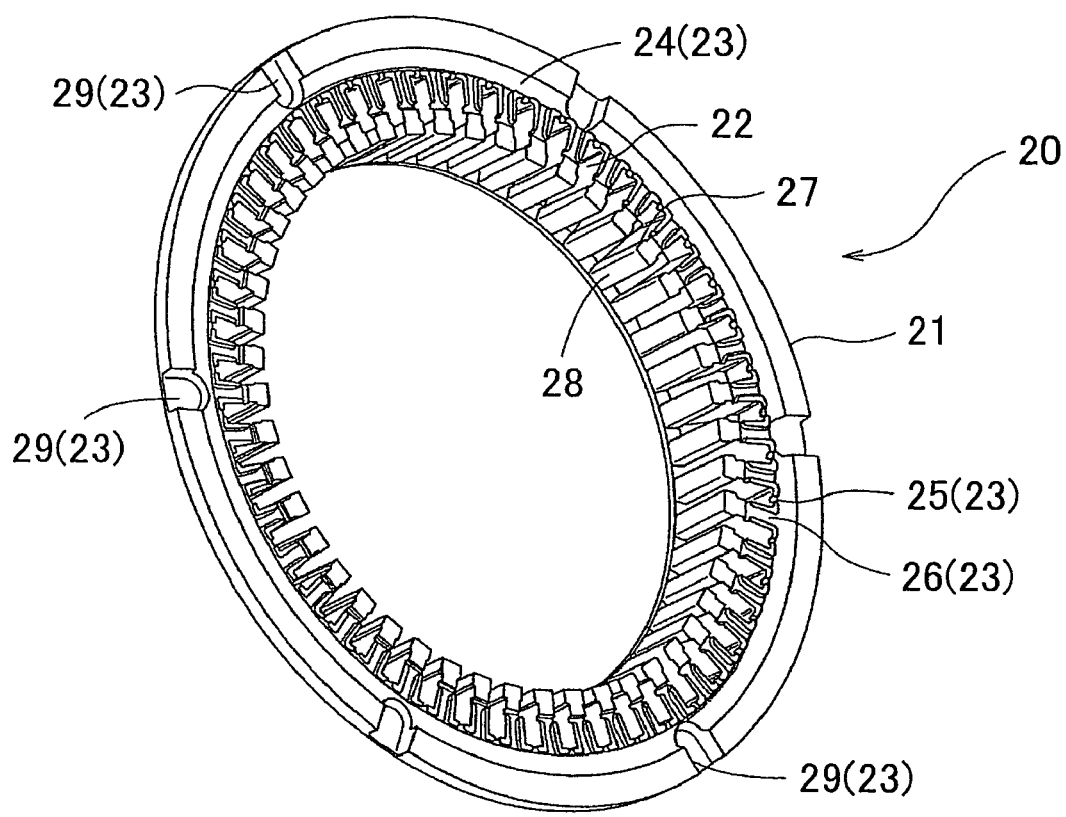
FIG. 5 is a perspective view of the cover member.

FIG. 5 is a perspective view of the cover member 20. As shown in FIG. 5, the cover member 20 includes a main body portion 21, the accommodating chambers 22, and the introducing path 23. The cover member 20 is made of, e.g., an insulating material such as a resin.

As shown in FIGS. 1 and 2, the main body portion 21 is shaped so as to cover the outer peripheral surface of the coil end portion 12 along the entire circumference and so as to entirely cover the axial conductor portions 13 when viewed in the axial direction. In the present embodiment, the outer peripheral surface of the coil end portion 12 indicates the surface along the radial outermost periphery of the plurality of axial conductor portions 13 of the coil end portion 12.

The accommodating chambers 22 are spaces that are formed radially inside the main body portion 21, and individually accommodate the plurality of axial conductor portions 13, and the number of accommodating chambers 22 is the same as that of the axial conductor portions 13. As shown in FIG. 5, the cover member 20 has the plurality of radial wall portions 27 that are arranged in a radial pattern along the radial direction, and each radial wall portion 27 is inserted between two adjacent axial conductor portions 13, and each accommodating chamber 22 is formed between two adjacent radial wall portions 27. Moreover, ridges 28, which protrude in the circumferential direction and extend in the axial direction, are respectively formed on radial inner ends of the radial wall portions 27. An opening of each accommodating chamber 22 is formed by the space between the two adjacent ridges 28. Thus, the circumferential width of the opening of each accommodating chamber 22 is smaller than the circumferential width inside the accommodating chamber 22.

Figure 6:
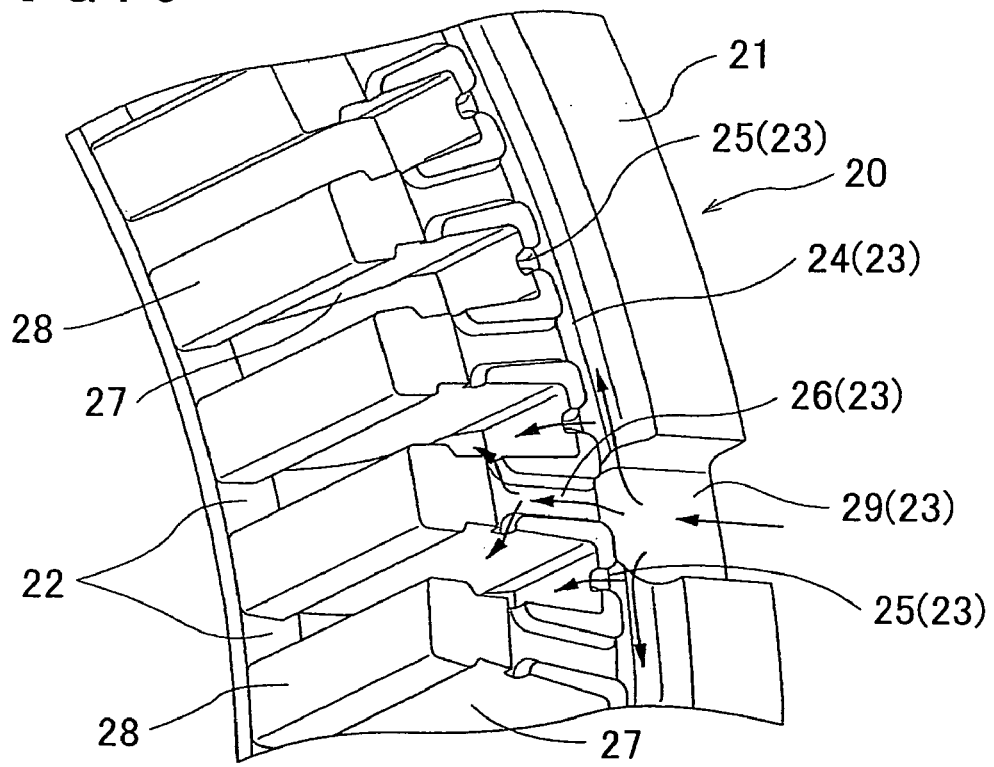
FIG. 6 is a partial enlarged view of FIG. 5, illustrating a flow of a coolant.

The introducing path 23 is a flow path for introducing the coolant into the accommodating chambers 22. As shown in FIGS. 5 and 6, in the present embodiment, the introducing path 23 has: a circulating path 24, which is formed by a recessed groove formed in the end face on the stator core 3 side of the main body portion 21, and extends in the entire circumference on the radially outer side of the accommodating chambers 22; connection paths 25, 26 connecting the circulating path 24 and the inside of each accommodating chamber 22; and introducing ports 29 for introducing the coolant to the circulating path 24. Note that FIG. 6 is a partially enlarged illustration of FIG. 5, showing a flow of the coolant. The connection paths have: first connection paths 25, each connecting the circulating path 24 and the corresponding accommodating chamber 22 through the radial outer wall of the accommodating chamber 22; and second connection paths 26, each provided between the two adjacent accommodating chambers 22, and each extending radially inwards from the circulating path 24 and connecting to the inside of the accommodating chambers 22 through circumferential sidewalls of the accommodating chambers 22. The same number of introducing ports 29 as that of welding grooves 61 formed in the stator core 3 described above (six in the present embodiment) are formed at positions that divide the outer periphery substantially equally in the circumferential direction.

Figure 15A:
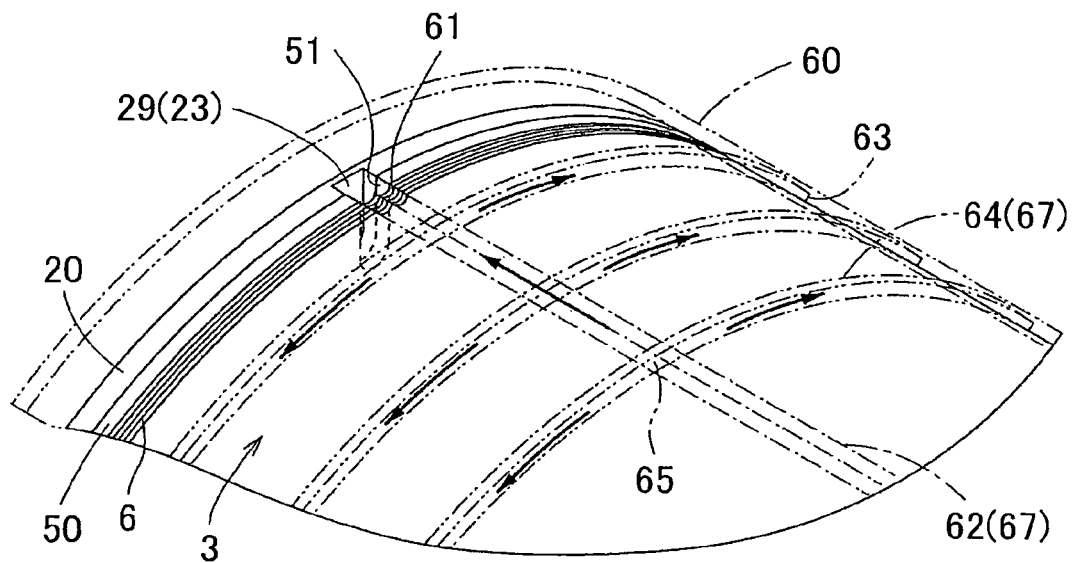
FIGS. 15A and 15B show illustrations showing a flow of the coolant in a cooling medium supply path and the introducing path.
Figure 15B:
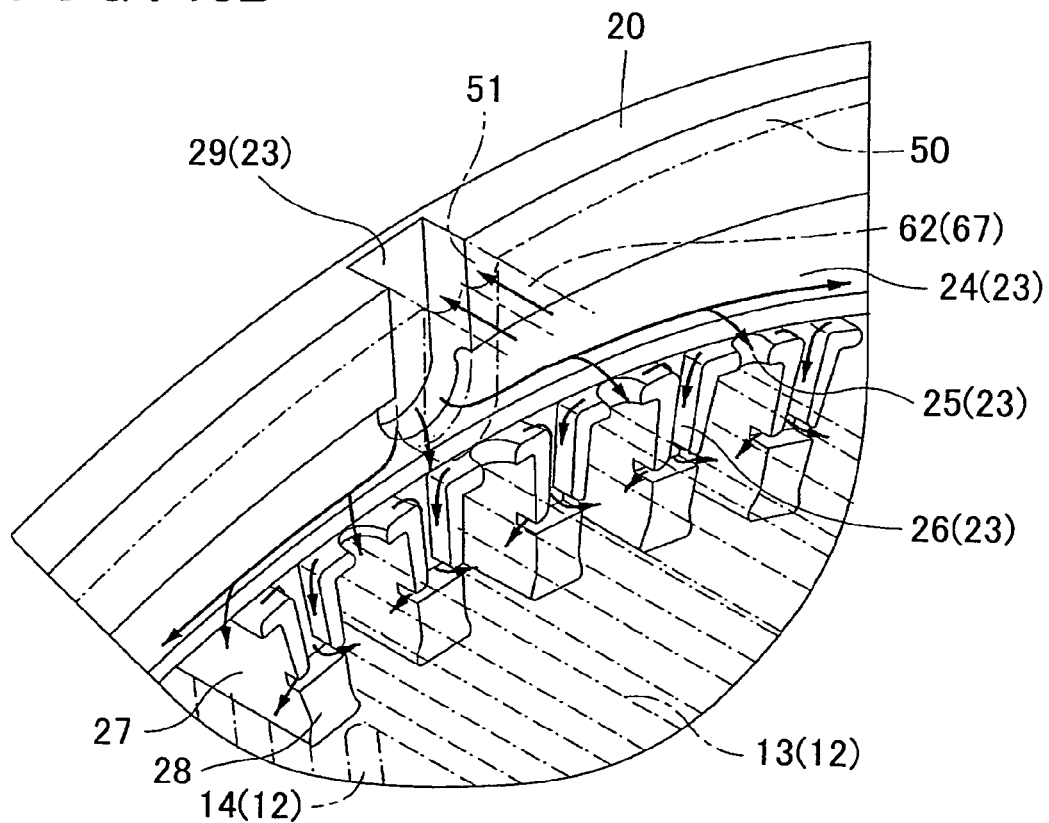

As described in detail below, as shown in FIGS. 15A and 15B, which is an illustration showing a flow of the coolant in a cooling medium supply path 67 and the introducing path 23, the coolant is supplied to each introducing port 29 through a respective axial flow path 62 formed in the outer peripheral surface of the stator core 3, and a corresponding communication path 51 of the base member 50. In FIG. 6, a flow of the coolant supplied to the introducing port 29 is shown by solid arrows, where the coolant supplied to the introducing port 29 is supplied to the circulating path 24, and then, supplied from the circulating path 24 into the accommodating chambers 22 through the first connection paths 25 and the second connection paths 26.

3. Structure of the Base Member

Figure 7:
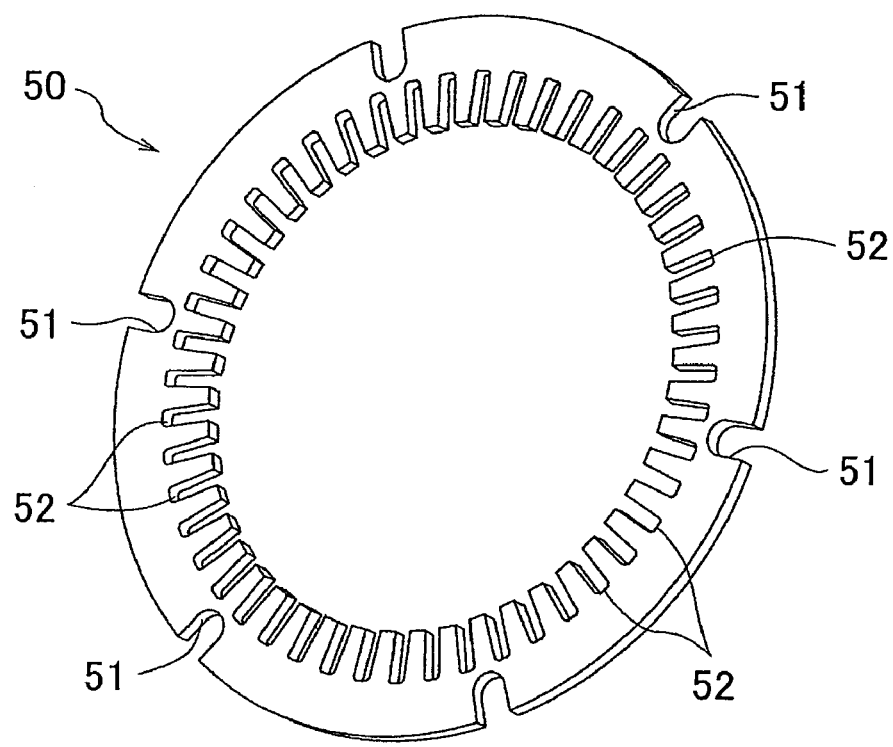
FIG. 7 is a perspective view of a base member.

FIG. 7 is a perspective view of the base member 50. The base member 50 is made of, e.g., an insulating material such as a resin. As shown in FIG. 7, the base member 50 is an annular disc-shaped member having a plurality of recesses 52 formed on an inner peripheral surface side so as to correspond to the plurality of slots 2 of the stator core 3, respectively. As shown in FIGS. 1 and 4, the base member 50 is interposed and attached between an axial end face of the stator core 3 and the cover member 20. Thus, the axial position of the cooling path 30 formed by the cover member 20 is determined by the axial thickness of the base member 50.

The communication paths 51 are formed in the base member 50. As shown in FIGS. 15A and 15B, each communication path 51 is a flow path for providing communication between the axial flow path 62 formed in the outer peripheral surface of the stator core 3, and the introducing path 23 provided in the cover member 20. In the present embodiment, each communication path 51 is structured to provide communication between the axial flow path 62 and the introducing port 29, so that the coolant flowing in the axial flow path 62 is supplied into the accommodating chambers 22. The same number of communication paths 51 as that of introducing ports 29 (six in the present embodiment) are formed at positions that divide the outer periphery substantially equally in the circumferential direction.

4. Structure of the Sealing Member

Figure 8:
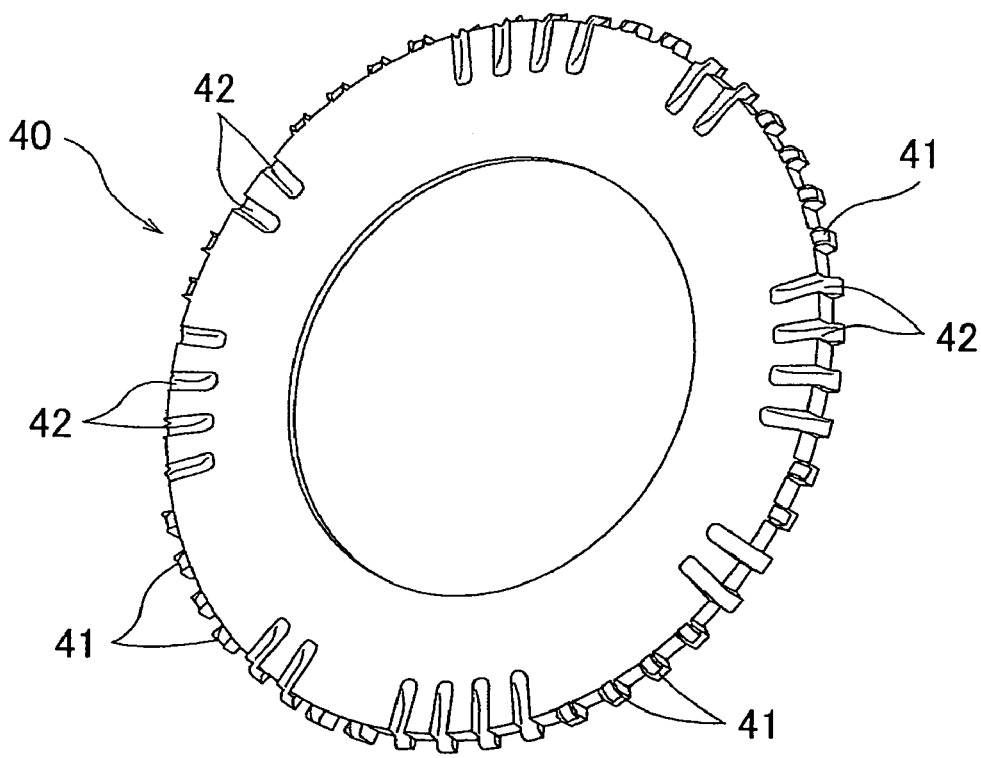
FIG. 8 is a perspective view of a sealing member.
Figure 9:
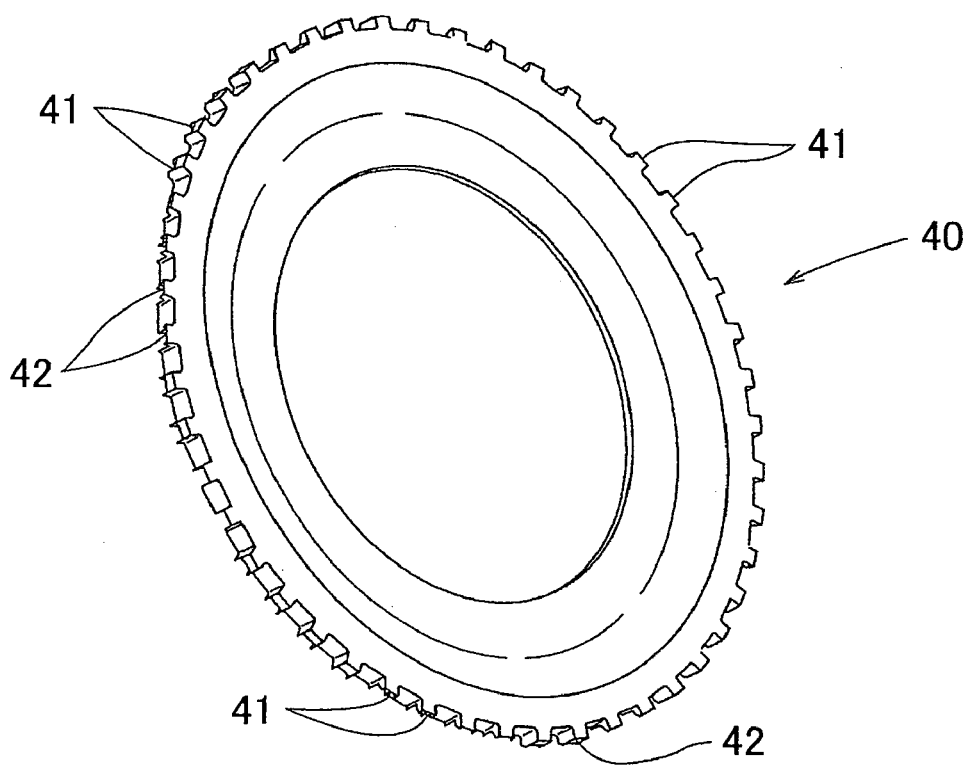
FIG. 9 is a perspective view of the sealing member.

FIG. 8 is a perspective view of the sealing member 40 as viewed from the coil end portion 12 side. FIG. 9 is a perspective view of the sealing member 40 as viewed from the stator core 3 side. The sealing member 40 is made of, e.g., an insulating material such as a resin. As shown in FIG. 1, the sealing member 40 is an annular disc-shaped member, which is positioned radially inside the cover member 20, and is attached to the axial end of the stator core 3. The sealing member 40 is a member for closing the openings of the accommodating chambers 22 which are open inwards in the radial direction of the stator, within the range of the axial thickness of the sealing member 40.

As shown in FIG. 8, the sealing member 40 includes a plurality of sealing protrusions 41, which are provided on the outer peripheral surface of the sealing member 40 at the same intervals as those of the plurality of slots 2, and the sealing protrusions 41 are structured to close the respective openings of the accumulating chambers 22. Moreover, the sealing member 40 has a plurality of (24 in the present embodiment) coil receiving portions 42, in which a part of the linear conductors provided radially inside the coil end portion 12 is inserted in the state where the sealing member 40 is attached to the axial end of the stator core 3.

5. Attachment Order

Figure 10:
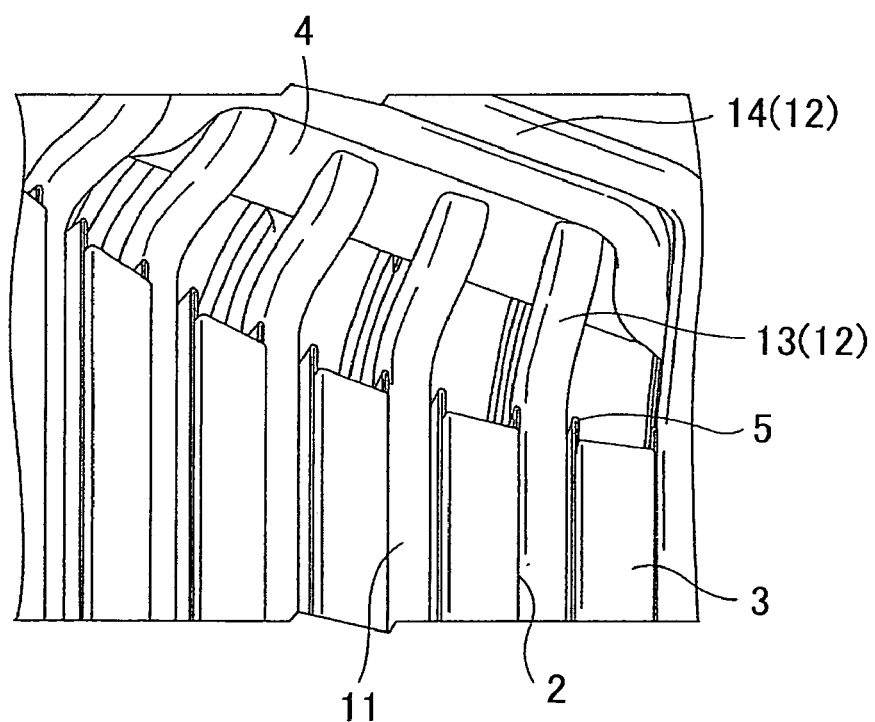
FIG. 10 is a schematic view showing a region near the boundary between slot conductor portions and axial conductor portions in the state before the cover member, the base member, and the sealing member are attached, when viewed from a radially inward direction.
Figure 11:
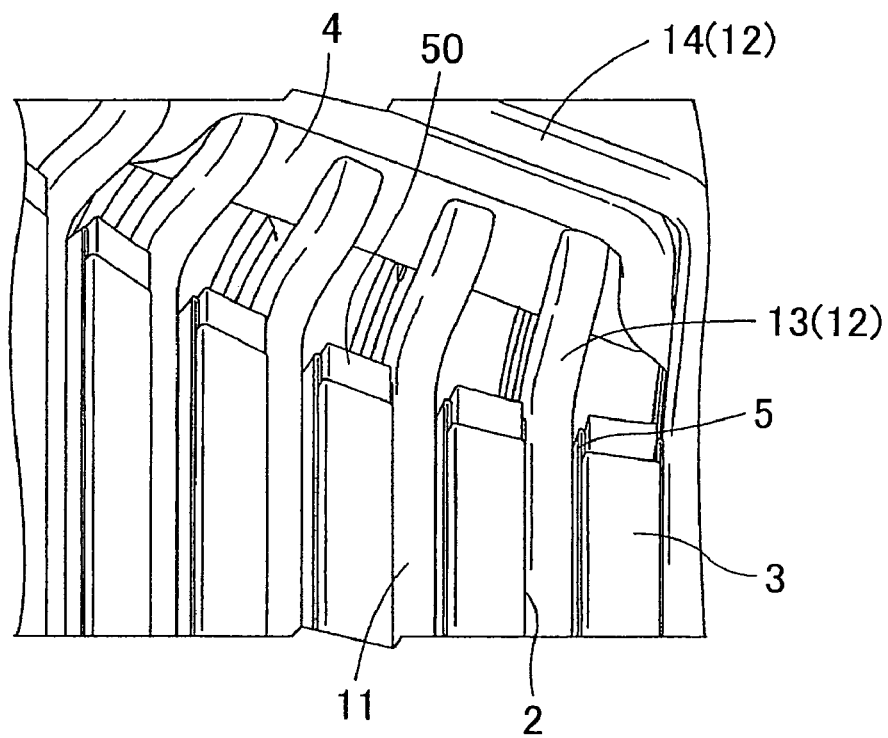
FIG. 11 is a schematic view showing the state where the base member has been attached in FIG. 10.
Figure 12:
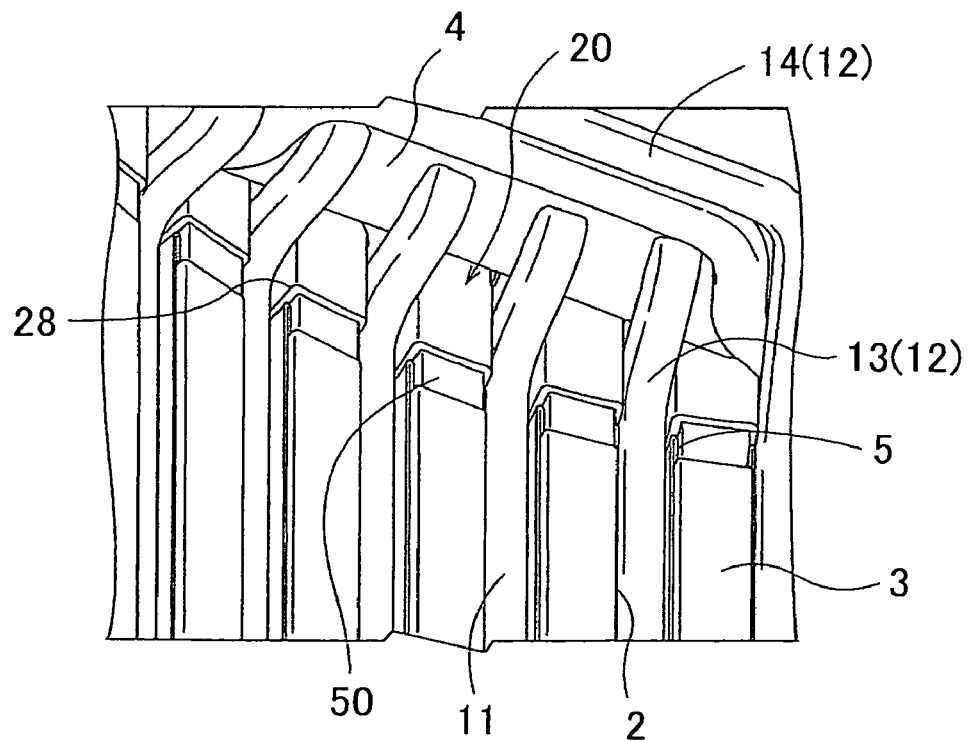
FIG. 12 is a schematic view showing the state where the cover member has further been attached in FIG. 11.
Figure 13:
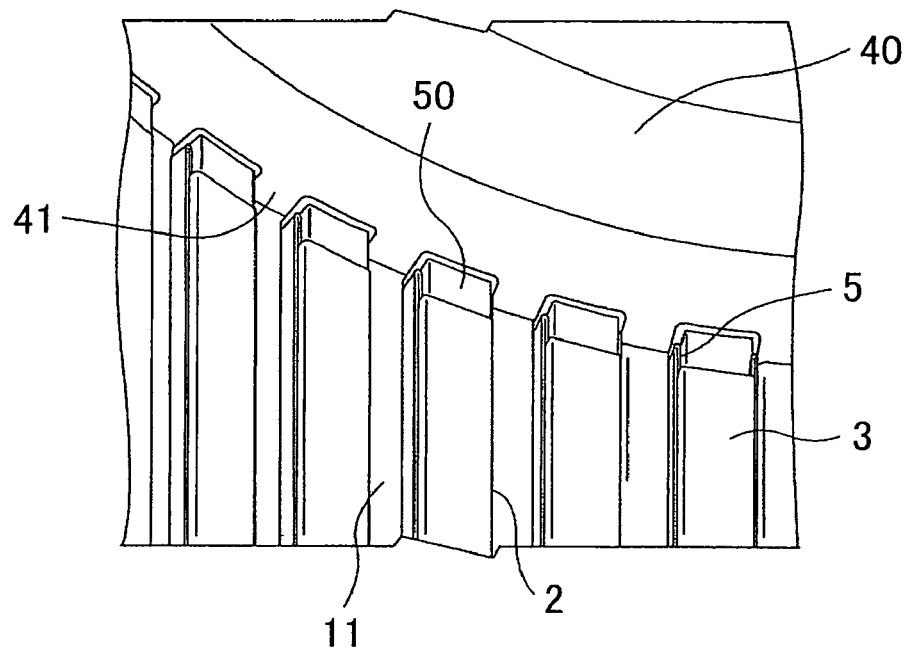
FIG. 13 is a schematic view showing the state where the sealing member has further been attached in FIG. 12.

The order of attaching the cover member 20, the base member 50, and the sealing member 40 will be described below with reference to FIGS. 10 through 13. Note that these members are fixed so as to obtain a fluid-tight state. FIG. 10 is a schematic view showing a portion near the boundary between the slot conductor portions 11 and the axial conductor portions 13 in the state before the cover member 20, the base member 50, and the sealing member 40 are attached, as viewed from the radially inward direction. FIG. 11 is a schematic view showing the state where the base member 50 has been attached in FIG. 10. FIG. 12 is a schematic view showing the state where the cover member 20 has also been attached in FIG. 11. FIG. 13 is a schematic view showing the state where the sealing member 40 has also been attached in FIG. 12.

As shown in FIG. 10, a slot inner insulating sheet 5 is inserted in each slot 2 so that a part of the slot inner insulating sheet 5 protrudes from the axial end of the stator core 3. In the present embodiment, the slot inner insulating sheet 5 corresponds to an insulating sheet of the present invention. Like the interphase insulating sheet 4, for example, a sheet formed by a material having a high electrical insulating property and high heat resistance, such as a bonded sheet of aramid fiber and polyethylene terephthalate, or the like may be used as the slot inner insulating sheet 5.

As shown in FIG. 11, the base member 50 is first attached to the axial end of the stator core 3. Note that the axial thickness of the base member 50 is larger than a protruding amount of the slot inner insulating sheet 5 from the axial end. At this time, as shown in FIGS. 15A and 15B, the circumferential position of the base member 50 is determined so that each communication path 51 of the base member 50 communicates with a corresponding axial flow path 62 described below.

Figure 14:
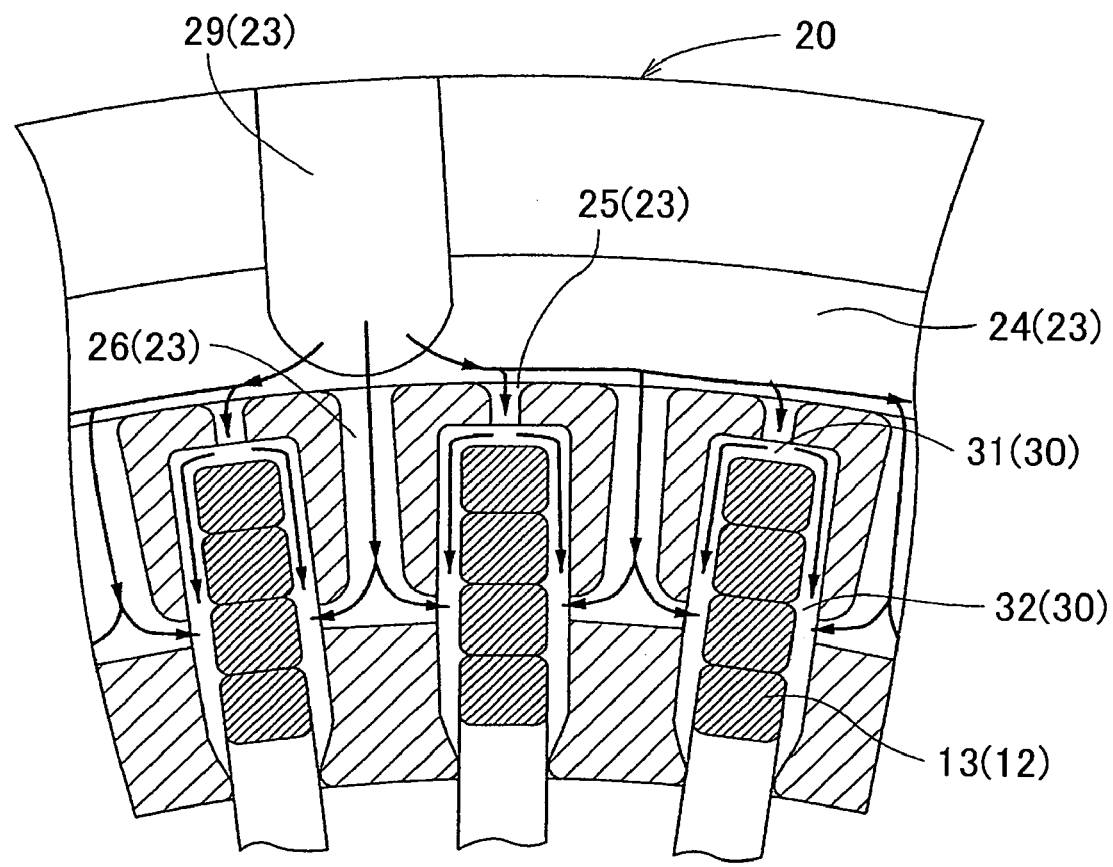
FIG. 14 is an illustration showing a flow of the coolant in an introducing path in the cover member.

Then, as shown in FIG. 12, the cover member 20 is attached to an axial end of the base member 50, which is located on the opposite side to an axial end on the stator core 3 side. At this time, as shown in FIGS. 15A and 15B, the circumferential position of the cover member 20 is determined so that each introducing port 29 of the cover member 20 communicates with a corresponding axial flow path 62 described below. Since the base member 50 and the cover member 20 contact with each other in a fluid-tight state, the coolant supplied to the introducing ports 29 of the cover member 20 flows only in the circulating circuit 24, the first connection paths 25, and the second connection paths 26, and is supplied to outer peripheral regions 31 and lateral regions 32 of the cooling path 30 formed in the accommodating chambers 22, as shown in FIG. 14. Note that FIG. 14 is an illustration showing a flow of the coolant in the introducing path 23 of the cover member 20. The cooling path 30 will be described in detail below.

Finally, as shown in FIG. 13, the sealing member 40 is attached to a radial inner side of the cover member 20. As shown in FIG. 13, the sealing protrusions 41 of the sealing member 40 respectively close the openings of the accommodating chambers 22. Note that the axial position of the sealing member 40 is determined so that an end face of the sealing member 40 located on the stator core 3 side is substantially aligned with an end face of the cover member 20 located on the stator core 3 side, as shown in FIGS. 1 and 13. Moreover, the circumferential position of the sealing member 40 is determined so that 24 linear conductors, which are disposed closest to the sealing member 40, out of the linear conductors that form the coil end portion 12, are inserted in the coil receiving portions 42 of the sealing member 40.

6. Cooling Mechanism of the Stator

As described above, the stator 1 of the present embodiment includes the cylindrical member 60 and the cover member 20. The cooling medium supply path 67 is formed by the cylindrical member 60, and the cooling path 30 for cooling the coil end portion 12 is formed by the cover member 20. The structures of the cooling medium supply path 67 and the cooling path 30 will be described in detail below.

6-1. Structure of the Cooling Medium Supply Path

FIG. 15A is an illustration showing a flow of the coolant in the cooling medium supply path 67, and the flow of the coolant is shown by solid arrows. In the present embodiment, the cooling medium supply path 67 includes the axial flow paths 62 and circumferential flow paths 64.

The axial flow paths 62 is flow paths, which are formed by the inner peripheral surface of the cylindrical member 60, and the welding grooves 61 formed in the stator core 3, and in which the coolant flows in the axial direction on the outer peripheral surface of the stator core 3. As described above, the welding grooves 61 are formed at positions that divide the outer peripheral surface of the stator core 3 substantially equally into six in the circumferential direction, and the axial flow paths 62 are respectively formed at the positions where the welding grooves 61 are provided. FIG. 15A shows one of the axial flow paths 62. Each axial flow path 62 communicates with the corresponding introducing port 29 of the cover member 20 through the corresponding communication path 51 of the base member 50 in the axial end of the stator core 3.

The circumferential flow paths 64 are flow paths, which are formed by the outer peripheral surface of the stator core 3, and the circumferential recessed grooves 63 formed in the cylindrical member 60, and in which the coolant flows in the circumferential direction on the outer peripheral surface of the stator core 3. As described above, the circumferential recessed grooves 63 are formed at a plurality of positions in the axial direction, and the circumferential flow paths 64 are respectively formed at the positions where the circumferential recessed grooves 63 are provided. FIG. 15A shows three of the circumferential flow paths 64. The axial flow paths 62 and the circumferential flow paths 64 are structured to cross each other at a plurality of intersections 65, and to communicate with each other at the intersections 65.

Since the coolant supply path 67 is structured as described above, the coolant, which is supplied to a flow path (not shown) communicating with the axial flow paths 62 when a pump, not shown, is operated, flows through the axial flow paths 62, and is supplied to the introducing ports 29 of the cover member 20 through the communication paths 51 of the base member 50. Moreover, a part of the coolant flowing in the axial flow paths 62 is distributed to the circumferential flow paths 64, and the coolant flowing through the circumferential flow paths 64 cools the outer peripheral surface of the stator core 3. After cooling the outer peripheral surface of the stator core 3, the coolant flows into any of the axial flow paths 62 through any of the intersections 65.

6-2. Structure of the Cooling Path

The cooling path 30 is a flow path, which is formed by the gaps between the inner wall surface of each accommodating chamber 22 of the cover member 20, and each axial conductor portion 13, and in which the coolant introduced from the introducing path 23 flows. That is, the cooling path 30 is defined by the inner wall surfaces of the accommodating chambers 22. Moreover, since the axial conductor portions 13 are respectively accommodated in the accommodating chambers 22, the cooling path 30 is formed around each axial conductor portion 13. The coolant is supplied to the cooling path 30 from the cooling medium supply path 67 through the introducing path 23 of the cover member 20. FIG. 15B shows a flow of the coolant in the introducing path 23 of the cover member 20. In this drawing, the flow of the coolant when the coolant supplied from the axial flow path 62 of the cooling medium supply path 67 flows into the cooling path 30 is shown by solid arrows.

As shown in FIG. 14, the cooling path 30 has the outer peripheral region 31 and the lateral region 32, which communicate with each other. The axial conductor portion 13 is cooled when the coolant flows in the outer peripheral region 31 and the lateral region 32. Note that, as shown in FIG. 14, the cooling path 30 is formed so as to surround each axial conductor portion 13.

Figure 16:
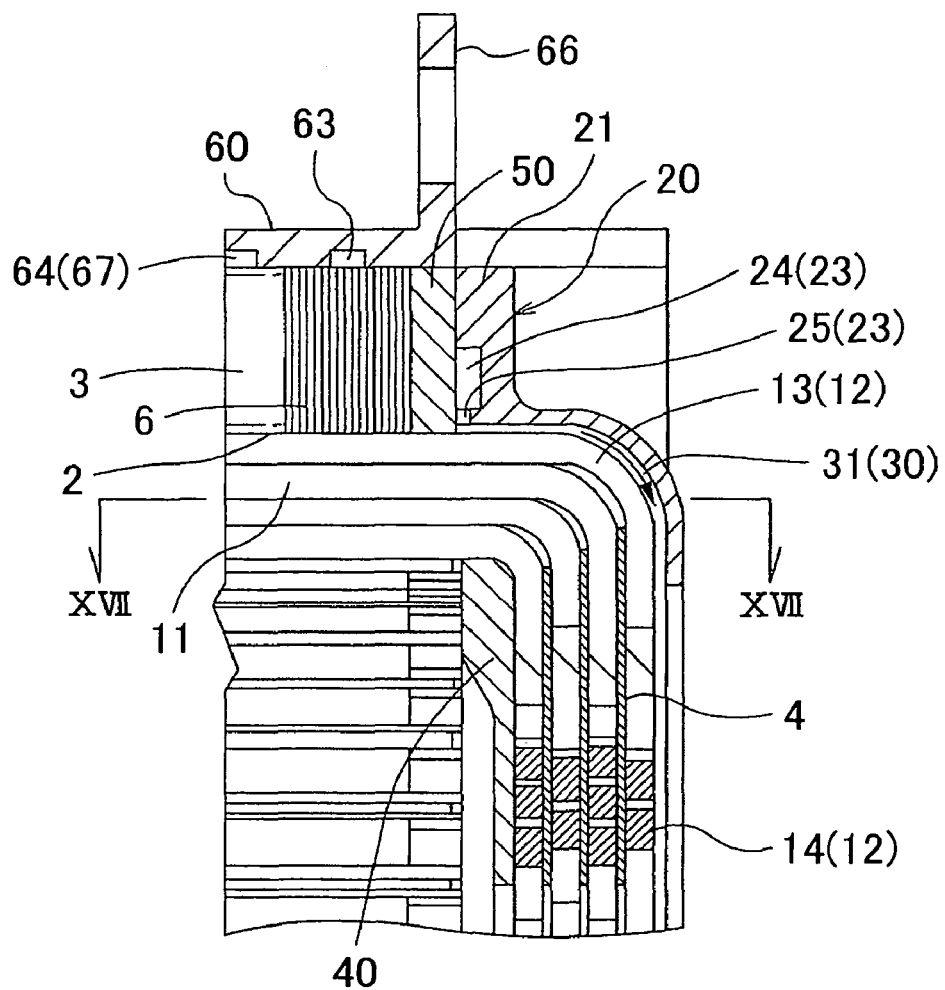
FIG. 16 is a partially enlarged cross-sectional view of the stator.
Figure 17:
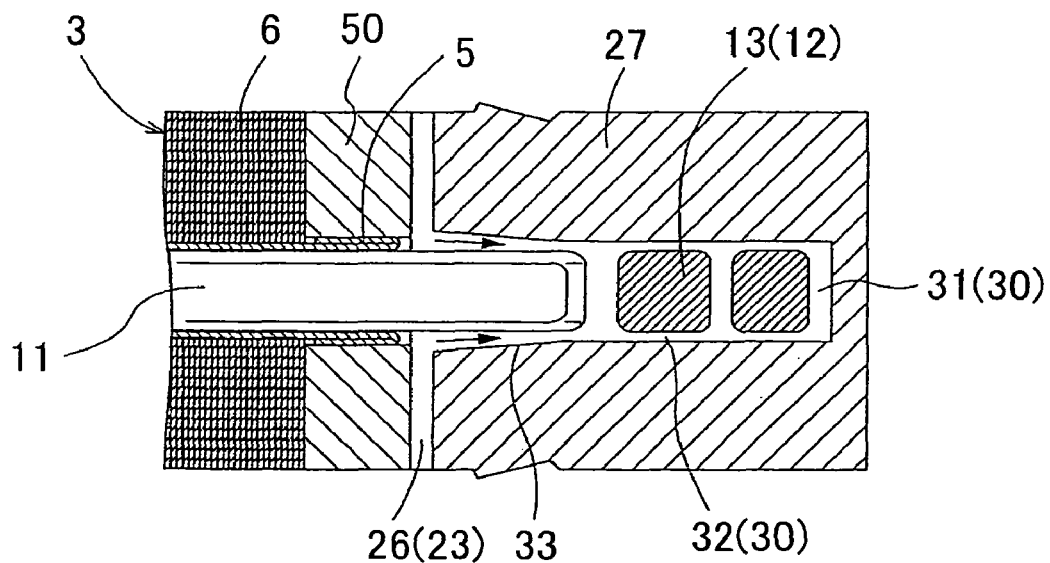
FIG. 17 is a cross-sectional view taken along line XVII-XVII in FIG. 16.

The outer peripheral region 31 is a region where the coolant flows along the radial outer surface of the axial conductor portion 13. As shown FIG. 16, which is a partial enlarged view of the stator 1, the outer peripheral region 31 is bent radially inwards along the radial outer surface of the axial conductor portion 13, and communicates with an opening of the cooling path 30, which is open radially inwards. Solid arrow in FIG. 16 shows how the coolant flows in the outer peripheral region 31. Moreover, as shown in FIG. 17, which is a cross-sectional view taken along line XVII-XVII in FIG. 16, the lateral region 32 is a region where the coolant flows along both circumferential side surfaces of the axial conductor portion 13. Solid arrows in FIG. 17 show how the coolant flows in the lateral region 32. The lateral region 32 is also bent radially inwards along the circumferential side surface of the axial conductor portion 13, and communicates with the above opening of the cooling path 30. Note that the opening of the cooling path 30 is formed by the gap between the opening of each accommodating chamber 22, which is not closed by the sealing protrusions 41 of the sealing member 40, and each axial conductor portion 13.

As shown in FIG. 14, the coolant supplied to the introducing port 29 flows into the outer peripheral region 31 of the cooling path 30 through the circulating path 24 and the first connection path 25, and also flows into the lateral region 32 of the cooling path 30 through the second connecting path 26. Moreover, the coolant flowing into the cooling path 30 flows toward the above opening of the cooling path 30, formed on the inner diameter side, along the radial outer surface and both circumferential side surfaces of each axial conductor portion 13, or through the gaps between the linear conductors of the axial conductor portions 13. After cooling the axial conductor portions 13, the coolant flows out of the cover member 20 through the opening of the cooling path 30, and is supplied to the circumferential conductor portions 14. Then, the coolant cools the circumferential conductor portions 14 when flowing along the circumferential conductor portions 14.

Moreover, as shown in FIG. 17, the cooling path 30 has a throttle portion 33 where the flow path cross-sectional area gradually decreases from a junction with the introducing path 23 toward the downstream side. The throttle portion 33 is provided to make the flow rate of the coolant on the downstream side of the throttle portion 33 higher than that on the upstream side thereof. In the present embodiment, the circumferential thickness of the radial wall portions 27 is determined so that the distance between two adjacent radial wall portions 27 decreases from the end face on the stator core 3 side toward a predetermined axially outer position. The circumferential thickness of the radial wall portions 27 is determined as described above in the entire region in the radial direction except for the locations where the ridges 28 are formed. Note that the opening of the cooing path 30 is formed by the gaps between the opening of each accommodating chamber 22 formed by the ridges 28 of the radial wall portions 27, and each axial conductor portion 13. Thus, the throttle portion 33 is formed in the entire region in the radial direction except for the opening of the cooling path 30.

Note that a terminal end (a downstream end) of the throttle portion 33 is located at the same position as that of the end face of the sealing member 40 located on the opposite side to the end face on the stator core 3 side, or at a position closer to the stator core 3 than that position. Note that, in the present embodiment, the terminal end (the downstream side end) is located at substantially the same position as that of the end face of the sealing member 40 located on the opposite side to the end face on the stator core 3 side. Thus, when flowing axially outwards in the throttle portion 33, the coolant cannot escape radially inwards from the accommodating chambers 22, and the flow path cross-sectional area is reduced in the closed flow path. Thus, the flow rate of the coolant supplied to the downstream side of the throttle portion 33 can be effectively increased.

(Other Embodiments)

(1) The above embodiment has been described with respect to an example in which the main body portion 21 of the cover member 20 is shaped so as to entirely cover the axial conductor portions 13 when viewed in the axial direction. However, embodiments of the present invention are not limited to this. That is, it is also one of preferred embodiments of the present invention that the main body portion 21 of the cover member 20 cover a radial outer region of the axial end face of the coil end portion 12. Moreover, the main body portion 21 of the cover member 20 may cover only the outer peripheral surface of the coil end portion 12 without covering the axial end face of the coil end portion 12.

(2) The above embodiment has been described with respect to an example in which the ridges 28, which protrude in the circumferential direction and extend in the axial direction, are formed on the radial inner ends of the radial wall portions 27. However, embodiments of the present invention are not limited to this. That is, it is also one of preferred embodiments of the present invention that no ridge 28 be formed in the radial inner ends of the radial wall portions 27.

(3) The above embodiment has been described with respect to an example in which the introducing path 23 has the circulating path 24 that extends in the entire circumference on the radially outer side of the accommodating chambers 22, and the connection paths that connect the circulating path 24 and the inside of each accommodating chamber 22. However, embodiments of the present invention are not limited to this. That is, it is also one of preferred embodiments of the present invention that the introducing path 23 have no circulating path 24, and the coolant be individually supplied to the individual accommodating chambers 22.

(4) The above embodiment has been described with respect to an example in which the connection paths have: the first connection paths 25, each connecting the circulating path 24 and the corresponding accommodating chamber 22 through the radial outer wall of the accommodating chamber 22; and the second connection paths 26, each provided between the two adjacent accommodating chambers 22, and each extending radially inwards from the circulating path 24 and connecting to the inside of the accommodating chambers 22 through the circumferential sidewalls of the accommodating chambers 22. However, embodiments of the present invention are not limited to this. That is, it is also one of preferred embodiments of the present invention that the connection paths have only either of the first connection paths 25 and the second connection paths 26.

(5) The above embodiment has been described with respect to an example in which the slot inner insulating sheet 5 inserted into the slots 2 protrudes from the axial end of the stator core 3, and the axial thickness of the base member 50 of the stator 1 is larger than the protruding amount of the slot inner insulating sheet 5 from the axial end of the stator core 3. However, embodiments of the present invention are not limited to this. That is, it is also one of preferred embodiments of the present invention that the slot inner insulating sheet 5 hardly protrude from the axial end of the stator core 2. In this case, the stator 1 may be configured to include no base member 50.

(6) The above embodiment has been described with respect to an example in which the stator 1 includes the base member 50, and the communication paths 51 for providing communication between the cooling medium supply path 67 formed in the outer peripheral surface of the stator core 3, and the introducing path 23 provided in the cover member 20 are formed in the base member 50. However, embodiments of the present invention are not limited to this. That is, it is also one of preferred embodiments of the present invention that the base member 50 have no communication path 51, in the case where, for example, no cooling medium supply path 67 is formed in the outer peripheral surface of the stator core 3. The stator 1 may be configured to include no base member 50.

(7) The above embodiment has been described with respect to an example in which the stator 1 includes the sealing member 40, and the sealing protrusions 41 of the sealing member 40 close the openings of the accommodating chambers 22. However, embodiments of the present invention are not limited to this. That is, it is also one of preferred embodiments of the present invention that the sealing member 40 that include no sealing protrusion 41 close the openings of the accommodating chambers 22. For example, the openings of the accommodating chambers 22 can be closed by the outer peripheral surface of the sealing member 40. The stator 1 may be configured to include no sealing member 40.

(8) The above embodiment has been described with respect to an example in which the cooling path 30 has an opening that is open radially inwards. However, embodiments of the present invention are not limited to this. That is, it is also one of preferred embodiments of the present invention that the cooling path 30 have an opening that is open axially outwards, rather than radially inwards, or the cooling path 30 have both an opening that is open radially inwards, and an opening that is open axially outwards.

(9) The above embodiment has been described with respect to an example in which the cooling path 30 has the outer peripheral region 31 where the coolant flows along the radial outer surface of the axial conductor portions 13, and the lateral region 32 where the coolant flows along both circumferential side surfaces of the axial conductor portions 13. However, embodiments of the present invention are not limited to this. That is, it is also one of preferred embodiments of the present invention that the cooling path 30 have only one of the outer peripheral region 31 and the lateral region 32.

(10) The above embodiment has been described with respect to an example in which the cooling path 30 has the throttle portion 33 where the flow path cross-sectional area decreases gradually from the junction with the introducing path 23 toward the downstream side. However, embodiments of the present invention are not limited to this. That is, it is also one of preferred embodiments of the present invention that the cooling path 30 have no throttle portion 33.

(11) The above embodiment has been described with respect to an example in which the introducing path 23 is formed by the recessed grooves formed in the end face of the main body portion 21 located on the stator core 3 side. However, embodiments of the present invention are not limited to this. That is, it is also one of preferred embodiments of the present invention that the introducing path 23 be formed by holes provided in the main body portion 21, or by a member other than the main body portion 21.

(12) The above embodiment has been described with respect to an example in which the circumferential recessed grooves 63 are formed in the inner peripheral surface of the cylindrical member 60, and the circumferential flow paths 64 are formed by the circumferential recessed grooves 63 and the outer peripheral surface of the stator core 3. However, embodiments of the present invention are not limited to this. That is, it is also one of preferred embodiments of the present invention that no circumferential recessed groove 63 be formed in the inner peripheral surface of the cylindrical member 60, and no circumferential flow path 64 be formed in the outer peripheral surface of the stator core 3.

(13) The above embodiment has been described with respect to an example in which the axial flow paths 62 are formed in the outer peripheral surface of the stator core 3 by the inner peripheral surface of the cylindrical member 60 and the welding grooves 61, and the axial flow paths 62 are structured as the cooling medium supply path 67 for supplying the coolant to the introducing path 23. However, embodiments of the present invention are not limited to this. For example, it is also one of preferred embodiments of the present invention that the axial flow paths 62 be formed by axial recessed grooves formed in the inner peripheral surface of the cylindrical member 60, and the outer peripheral surface of the stator core 3. Moreover, the cooling medium supply path 67 may be formed by a flow path provided inside a case accommodating the stator 1 or the like, instead of being formed by the axial flow paths 62 formed in the outer peripheral surface of the stator core 3.

(14) The above embodiment has been described with respect to an example in which the stator core 3 is accommodated in the cylindrical member 60. However, embodiments of the present invention are not limited to this. That is, it is also one of preferred embodiments of the present invention that the stator core 3 be fixed directly to a case, instead of being accommodated in the cylindrical member 60.

(15) The above embodiment has been described with respect to an example in which the coil 10 is formed in advance in such a predetermined shape that can be wound around the stator core 3, and the linear conductors of the coil 10 have a rectangular cross section. However, embodiments of the present invention are not limited to this. That is, it is also one of preferred embodiments of the present invention that the linear conductors of the coil 10 have a cross-sectional shape other than a rectangular cross-section, such as a circular cross-section. It is also one of preferred embodiments of the present invention that the coil 10 be not formed in such a predetermined shape that can be wound around the stator core 3.

(16) The above embodiment has been described with respect to an example in which the stator 1 is a stator that is used for rotating electrical machines that are driven by a three-phase alternating current. However, embodiments of the present invention are not limited to this. That is, it is also one of preferred embodiments of the present invention that the stator 1 be a stator that is used for rotating electrical machines that are driven by electric power other than the three-phase alternating current.

The present invention can be preferably used for various known stators that include a cylindrical stator core, which has a plurality of slots provided at predetermined intervals in a circumferential direction and being open toward an inner peripheral surface of the stator core, and a coil, which has a coil end portion protruding from an axial end of the stator core.

What is clamed is:

1. A stator comprising:
    a cylindrical stator core, which has a plurality of slots that are provided at predetermined intervals in a circumferential direction and open toward an inner peripheral surface of the stator core; and
    a coil, which has a coil end portion protruding from an axial end of the stator core, wherein
    the coil end portion includes a plurality of axial conductor portions, which are provided continuously with slot conductor portions that are respectively inserted in the plurality of slots, and extend from the plurality of slots outwards in an axial direction of the stator,
    the stator includes a cover member provided with a main body portion that covers at least an outer peripheral surface of the coil end portion along an entire circumference, accommodating chambers that are formed radially inside the main body portion and individually accommodate the plurality of axial conductor portions, and an introducing path through which a cooling medium is introduced into the accommodating chambers, and
    a gap between an inner wall surface of each of the accommodating chambers and each of the axial conductor portions serves as a cooling path in which the cooling medium introduced from the introducing path flows, and the cooling path has a throttle portion where a flow path cross-sectional area gradually decreases from a junction with the introducing path toward a downstream side.

2. The stator according to claim 1, wherein
the cooling path has an opening that is open inwards in a radial direction of the stator.

3. The stator according to claim 2, wherein
the cooling path has an outer peripheral region where the cooling medium flows along an outer surface of each of the axial conductor portions in the radial direction of the stator, and a lateral region where the cooling medium flows along both side surfaces of the each axial conductor portion in the circumferential direction of the stator.

4. The stator according to claim 3, wherein
the introducing path is formed by a recessed groove formed in an end face of the main body portion located on the stator core side.

5. The stator according to claim 4, wherein
the introducing path has a circulating path, which extends in the entire circumference on a radially outer side of the accommodating chambers, and a connection path that connects the circulating path and an inside of each of the accommodating chambers.

6. The stator according to claim 5, wherein
the connection path has a first connection path connecting the circulating path and each of the accommodating chambers through a radial outer wall of the each accommodating chamber, and a second connection path that is provided between two adjacent ones of the accommodating chambers, extends radially inwards from the circulating path, and connects to the accommodating chambers through circumferential sidewalls of the accommodating chambers.

7. The stator according to claim 5, wherein
the cover member has a plurality of radial wall portions, which are radially disposed along the radial direction of the stator and each inserted between two adjacent ones of the axial conductor portions, and
each of the accommodating chambers is formed between two adjacent ones of the radial wall portions.

8. The stator according to claim 7, wherein
a ridge that protrudes in the circumferential direction of the stator and extends in the axial direction of the stator is formed on an inner end of each of the radial wall portions in the radial direction of the stator.

9. The stator according to claim 7, further comprising:
a sealing member that is an annular disc-shaped member positioned radially inside the cover member and attached to the axial end of the stator core, and that closes openings of the accommodating chambers which are open inwards in the radial direction of the stator, within a range of an axial thickness of the sealing member.

10. The stator according to claim 9, wherein
the sealing member includes a plurality of sealing protrusions provided on an outer peripheral surface thereof at the same intervals as those of the plurality of slots, and
the sealing protrusions respectively close the openings of the accommodating chambers.

11. The stator according to claim 9, further comprising:
a base member, which is an annular disc-shaped member having a plurality of recesses formed on an inner peripheral surface side thereof so that the recesses correspond to the plurality of slots of the stator core, and which is attached between an axial end face of the stator core and the cover member.

12. The stator according to claim 11, wherein
an insulating sheet is inserted in each of the slots so that a part of the insulating sheet protrudes from the axial end of the stator, and
an axial thickness of the base member is larger than a protruding amount of the insulating sheet from the axial end.

13. The stator according to claim 11, wherein
a communication path that provides communication between a cooling medium supply path formed in an outer peripheral surface of the stator core, and the introducing path provided in the cover member, is formed in the base member.

14. The stator according to claim 11, wherein
the main body portion is formed so as to cover a part of a region on an outer side in the radial direction of the stator of an end face of the coil end portion in the axial end of the stator, in addition to the outer peripheral surface of the coil end portion.

15. The stator according to claim 14, wherein
the coil end portion has the axial conductor portions, and circumferential conductor portions which each connect the different slots in the circumferential direction so as to connect corresponding two of the axial conductor portions to each other, and
the cover member is shaped so as to entirely cover the axial conductor portions when viewed in the axial direction.

16. The stator according to claim 15, further comprising:
a cylindrical member having an inner peripheral surface in contact with an outer peripheral surface of the stator core, wherein
the stator core is a stacked structure of annular disc-shaped steel plates,
a welding groove is formed in the outer peripheral surface of the stator core so as to extend in the axial direction in order to further bond the steel plates in the stacked state together by welding,
an axial flow path, which is a flow path of the cooling medium flowing in the axial direction on the outer peripheral surface of the stator core, is formed by the inner peripheral surface of the cylindrical member and the welding groove, and
the axial flow path serves as a cooling medium supply path through which the cooling medium is supplied to the introducing path.

17. The stator according to claim 16, wherein
the cylindrical member has a circumferential recessed groove, which is formed in the inner peripheral surface so as to extend in a circumferential direction of the stator in an entire circumference of the stator,
a circumferential flow path, which is a flow path of the cooling medium flowing in the circumferential direction on the outer peripheral surface of the stator core, is formed by the outer peripheral surface of the stator core and the circumferential recessed groove, and
the circumferential flow path crosses the axial flow path, and communicates with the axial flow path at the intersection.

18. The stator according to claim 1, wherein
the cooling path has an outer peripheral region where the cooling medium flows along an outer surface of each of the axial conductor portions in the radial direction of the stator, and a lateral region where the cooling medium flows along both side surfaces of the each axial conductor portion in the circumferential direction of the stator.

19. The stator according to claim 1, wherein
the introducing path is formed by a recessed groove formed in an end face of the main body portion located on the stator core side.

20. The stator according to claim 1, wherein
the introducing path has a circulating path, which extends in the entire circumference on a radially outer side of the accommodating chambers, and a connection path that connects the circulating path and inside of each of the accommodating chambers.

21. The stator according to claim 1, wherein
the cover member has a plurality of radial wall portions, which are radially disposed along the radial direction of the stator and each inserted between two adjacent ones of the axial conductor portions, and
each of the accommodating chambers is formed between two adjacent ones of the radial wall portions.

22. The stator according to claim 1, further comprising:
a sealing member that is an annular disc-shaped member positioned radially inside the cover member and attached to the axial end of the stator core, and that closes openings of the accommodating chambers which are open inwards in the radial direction of the stator, within a range of an axial thickness of the sealing member.

23. The stator according to claim 1, further comprising:
a base member, which is an annular disc-shaped member having a plurality of recesses formed on an inner peripheral surface side thereof so that the recesses correspond to the plurality of slots of the stator core, and which is attached between an axial end face of the stator core and the cover member.

24. The stator according to claim 1, wherein
the main body portion is formed so as to cover a part of a region on an outer side in the radial direction of the stator of an end face of the coil end portion in the axial end of the stator, in addition to the outer peripheral surface of the coil end portion.

25. The stator according to claim 1, wherein
the coil end portion has the axial conductor portions, and circumferential conductor portions which each connect the different slots in the circumferential direction so as to connect corresponding two of the axial conductor portions to each other, and
the cover member is shaped so as to entirely cover the axial conductor portions when viewed in the axial direction.

26. The stator according to claim 1, further comprising:
a cylindrical member having an inner peripheral surface in contact with an outer peripheral surface of the stator core, wherein
the stator core is a stacked structure of annular disc-shaped steel plates,
a welding groove is formed in the outer peripheral surface of the stator core so as to extend in the axial direction in order to further bond the steel plates in the stacked state together by welding,
an axial flow path, which is a flow path of the cooling medium flowing in the axial direction on the outer peripheral surface of the stator core, is formed by the inner peripheral surface of the cylindrical member and the welding groove, and
the axial flow path serves as a cooling medium supply path through which the cooling medium is supplied to the introducing path.

* * * * *